(12) United States Patent
Klonowski et al.

(10) Patent No.: US 11,314,863 B2
(45) Date of Patent: Apr. 26, 2022

(54) BEHAVIORAL THREAT DETECTION DEFINITION AND COMPILATION

(71) Applicant: Webroot Inc., Broomfield, CO (US)

(72) Inventors: Eric Klonowski, Broomfield, CO (US); Fred Krenson, Denver, CO (US)

(73) Assignee: WEBROOT, INC., Broomfield, CO (US)

( * ) Notice: Subject to any disclaimer, the term of this patent is extended or adjusted under 35 U.S.C. 154(b) by 498 days.

(21) Appl. No.: 16/366,014

(22) Filed: Mar. 27, 2019

(65) Prior Publication Data

US 2020/0311267 A1 Oct. 1, 2020

(51) Int. Cl.
*G06F 21/56* (2013.01)
*G06F 9/455* (2018.01)
*G06F 8/41* (2018.01)

(52) U.S. Cl.
CPC ............. *G06F 21/566* (2013.01); *G06F 8/41* (2013.01); *G06F 9/45558* (2013.01); *G06F 21/567* (2013.01); *G06F 2009/45587* (2013.01)

(58) Field of Classification Search
CPC ...... G06F 21/552; G06F 21/56; G06F 21/566; G06F 21/567; G06F 8/41; G06F 2009/45587; G06F 9/45558
See application file for complete search history.

(56) References Cited

U.S. PATENT DOCUMENTS

| | | | |
|---|---|---|---|
| 8,479,162 B2 | 7/2013 | Li | |
| 8,555,385 B1 | 10/2013 | Bhatkar | |
| 8,762,948 B1 * | 6/2014 | Zaitsev | G06F 9/45558 717/124 |
| 8,776,218 B2 | 7/2014 | Wright | |
| 9,460,284 B1 | 10/2016 | Hajmasan | |
| 9,626,509 B1 | 4/2017 | Khalid | |
| 9,665,714 B1 | 5/2017 | Vlaznev | |
| 9,886,665 B2 * | 2/2018 | Chen | G06N 5/025 |
| 9,967,264 B2 * | 5/2018 | Harris | H04L 63/102 |
| 10,061,921 B1 * | 8/2018 | Chang | G06F 21/554 |

(Continued)

OTHER PUBLICATIONS

Office Action for U.S. Appl. No. 16/366,065, dated Feb. 23, 2022, 16 pgs.

(Continued)

*Primary Examiner* — Linglan E Edwards
(74) *Attorney, Agent, or Firm* — Sprinkle IP Law Group

(57) ABSTRACT

Examples of the present disclosure describe systems and methods for behavioral threat detection definition compilation. In an example, one or more sets of rule instructions may be packaged for distribution and/or use by a behavioral threat detection engine. As an example, a set of rule instructions is compiled into an intermediate language and assembled in to a compiled behavior rule binary. Event linking is performed, wherein other rules launched by the rule and/or events that launch the rule or are processed by the rule are identified, and such information may be stored accordingly. The behavior rule binary may be packaged with other rules associated with identifying a specific behavior. The packaged behavior rule is distributed to one or more computing devices for use with a behavioral threat detection engine. For example, the threat detection engine may execute the behavior rule using a rule virtual machine.

19 Claims, 6 Drawing Sheets

(56) References Cited

U.S. PATENT DOCUMENTS

| | | | |
|---|---|---|---|
| 10,102,372 B2* | 10/2018 | Huang | G06F 21/563 |
| 10,169,585 B1 | 1/2019 | Pilipenko | |
| 10,521,599 B2* | 12/2019 | Wurster | G06F 21/62 |
| 10,666,686 B1 | 5/2020 | Singh | |
| 10,965,717 B2* | 3/2021 | Shulman-Peleg | H04L 63/205 |
| 11,080,391 B2 | 8/2021 | Klonowski | |
| 11,080,394 B2 | 8/2021 | Klonowski | |
| 2009/0100518 A1 | 4/2009 | Overcash | |
| 2011/0225650 A1 | 9/2011 | Margolies | |
| 2012/0255012 A1 | 10/2012 | Sallam | |
| 2015/0334126 A1 | 11/2015 | Mooring | |
| 2016/0080399 A1* | 3/2016 | Harris | H04L 63/1433 |
| | | | 726/23 |
| 2016/0080417 A1 | 3/2016 | Thomas | |
| 2016/0162788 A1* | 6/2016 | Chen | G06N 5/025 |
| | | | 706/47 |
| 2018/0255080 A1 | 9/2018 | Paine | |
| 2019/0036978 A1* | 1/2019 | Shulman-Peleg | |
| | | | H04L 63/1441 |
| 2019/0081963 A1* | 3/2019 | Waghorn | H04L 63/1441 |
| 2019/0095320 A1 | 3/2019 | Biswas | |
| 2019/0318100 A1 | 10/2019 | Bhatia | |
| 2020/0076835 A1 | 3/2020 | Ladnai | |
| 2020/0186544 A1 | 6/2020 | Dichiu | |
| 2020/0311260 A1 | 10/2020 | Klonowski | |
| 2021/0303685 A1 | 9/2021 | Klonowski | |
| 2021/0326435 A1 | 10/2021 | Klonowski | |

OTHER PUBLICATIONS

Office Action for U.S. Appl. No. 16/366,040, dated Feb. 16, 2021, 10 pgs.

* cited by examiner

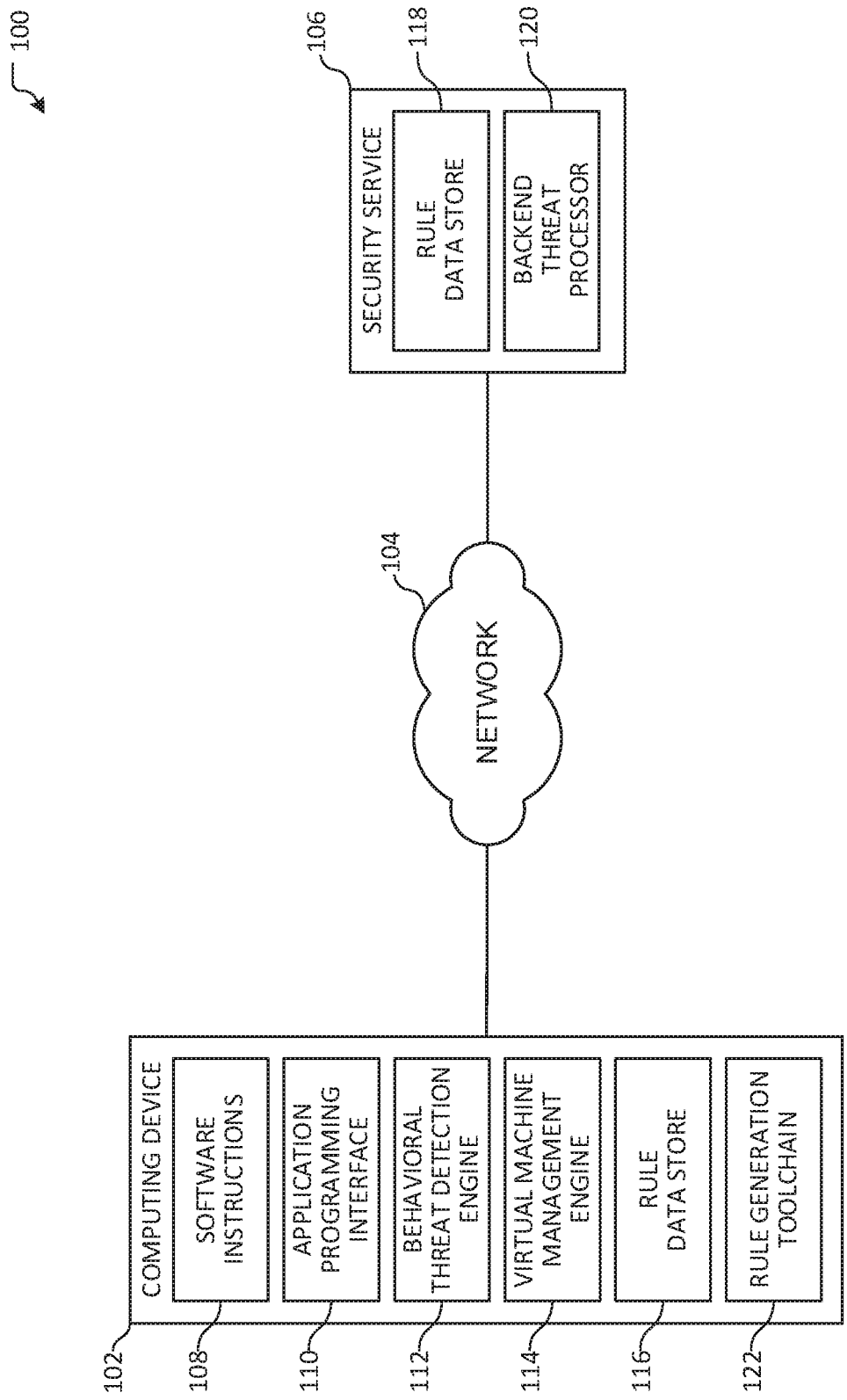

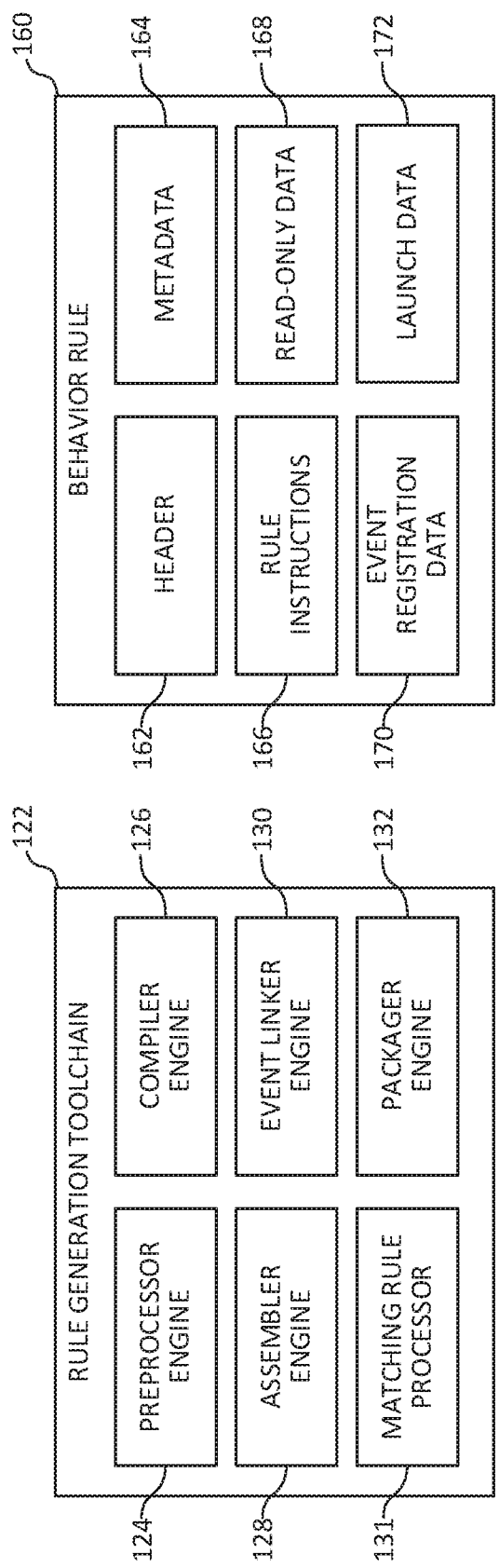

BEHAVIORAL THREAT DETECTION DEFINITION AND COMPILATION

BACKGROUND

Traditional malware detection techniques typically rely on signature-based analyses of files associated with potentially malicious software. However, minor changes, new versions, executable encryption or file packing, or other obfuscation techniques applied to such files may render traditional techniques ineffective against new threats until malware detection signatures are updated accordingly, resulting in a security solution that is reactionary and slow to adapt. Further, traditional techniques for logic- or conditional-based approaches introduce potential security vulnerabilities, complicate distribution of malware definitions, and are not well-suited to describe and analyze events.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for behavioral threat detection definition and compilation. In an example, a behavior rule comprising a set of rule instructions is used to define one or more events indicative of a behavior. For example, a set of events from which one event must be matched may be defined or a set of events from which all events must be matched may be defined. In some examples, events are matched based on an event name or type, or may be matched based on one or more parameters. Exact and/or inexact matching may be used. The set of rule instructions ultimately specifies one or more halt instructions, thereby indicating that a determination as to the presence of the behavior has been made. Example determinations include, but are not limited to, a match determination, a non-match determination, or an indication that additional monitoring should be performed.

One or more sets of rule instructions may be packaged for distribution and/or use by a behavioral threat detection engine. As an example, a set of rule instructions is compiled into an intermediate language and assembled in to a compiled behavior rule binary. Event linking is performed, wherein other rules launched by the rule and/or events that launch the rule or are processed by the rule are identified, and such information may be stored accordingly. The behavior rule binary may be packaged with other rules and/or may be packaged with additional information, including, but not limited to, a friendly name, a description, information regarding one or more events processed by the behavior rule, and/or information regarding one or more rules launched by the behavior rule. The packaged behavior rule is distributed to one or more computing devices for use with a behavioral threat detection engine. For example, the threat detection engine may execute the behavior rule using a rule virtual machine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1A illustrates an overview of an example system for behavioral threat processing.

FIG. 1B illustrates an overview of an example rule generation toolchain for generating a behavior rule.

FIG. 1C illustrates an overview of an example behavior rule according to aspects described herein.

DETAILED DESCRIPTION

Figure 2:
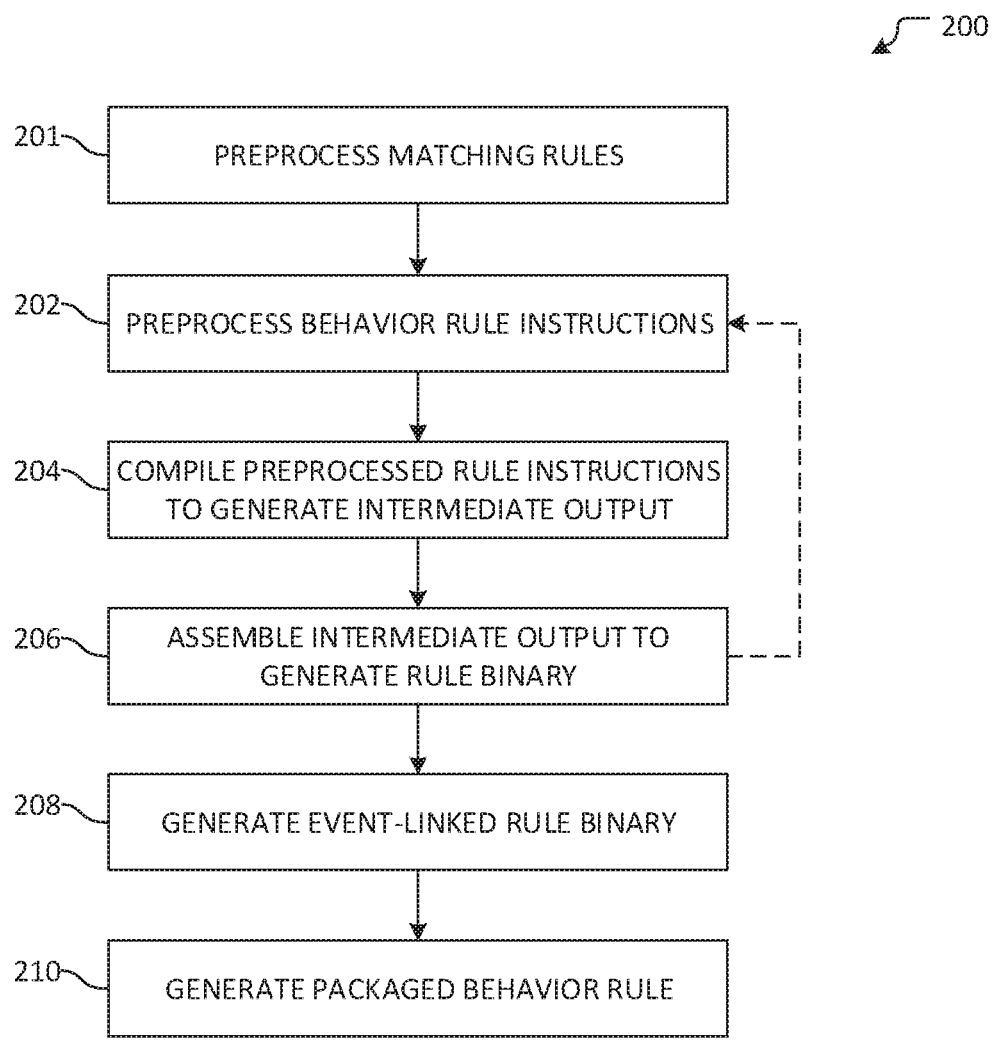
FIG. 2 illustrates an overview of an example method for generating a packaged behavior rule from a set of rule instructions.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In an example, a set of signatures is used to identify one or more files that pose a potential security threat to a computing device. Signatures may be periodically updated to provide protection against new threats and/or old threats that have been obfuscated using any of a variety of techniques. However, until the set of signatures used by the computing device is updated, the computing device may be susceptible to threats that are not identifiable using the current set of signatures. In other examples, one or more behaviors may be identified so as to identify the presence of potentially malicious software. However, defining such behaviors and, in some instances, enabling third parties to describe such behaviors, is difficult and may result in the introduction of other security vulnerabilities and added complexity in rule distribution, among other complications.

Accordingly, the present disclosure provides systems and methods for behavioral threat detection definition and compilation. In an example, a domain-specific language is used to describe one or more behaviors as rule instructions relating to a set of events, such that computations, comparisons, and other instructions may be applied to events and, in some instances, such that continued execution of the rule instructions is predicated on the occurrence (or lack thereof) of one or more events. In some examples, such rule instructions are processed by a compiler to generate a compiled behavior rule, which may be executed using a rule virtual machine. As a result, such rules may be platform-independent and/or version-independent (e.g., with respect to an operating system, an execution environment, and/or a behavioral threat detection engine), and may be executed in such a way that insulates a computing device from the rule instructions and/or the events that they process.

In examples, execution of a behavior rule in a rule virtual machine begins in response to, or in some instances, the absence of one or more events. As used herein, a rule virtual machine is a complex finite state machine used to execute a rule and arrive at a determination accordingly. Further, a rule virtual machine may be instantiated to execute a behavior rule for any of a variety of contexts. For instance, a context may relate to one or more applications, processes, threads, network connections, and/or files, or any combination thereof, among other examples. As a result, a behavior rule may process events that relate to the context, such that it may be determined whether an aspect of the context poses a potential threat to computer security. In some instances, a rule may cause another rule to be executed (e.g., based on the detection of an event, based on the determination of a certain condition, etc.), such that a hierarchy of rules may be executed based on detected behaviors. Thus, not only is it possible for a rule author to define behaviors using rule instructions that process events, but the rules may be platform-independent and/or hierarchically interrelated.

Aspects described herein provide various technical benefits, including, but not limited to, enabling the definition of event-based behavior rules (e.g., wherein rule instructions process parameters and/or values associated with such events, etc.), generating interrelated rules triggered based on a hierarchy of events, and implementing cross-platform and/or environment-agnostic rules. For example, as a result of executing a rule using a rule virtual machine, the computing device is insulated from potential exploits that may result from improperly coded rules, rules need not be recompiled for different execution environments, and rule distribution is simplified. Further, as a result of performing a behavioral analysis of a given context using a rule as described herein, it is possible to identify threats without relying on the rigid, reactive approach typically used by signature-centric, file-based techniques. The language and compilation suite discussed herein facilitates efficient behavior rule generation and distribution while reducing the potential risks and inconveniences associated with traditional behavior-based approaches. For example, traditional approaches may be architecture-dependent, thereby complicating the distribution of rules. As another example, rules authored in a traditional computing language may have the potential to introduce computer vulnerabilities if they are authored incorrectly or care is not taken when executing such rules. Thus, it will be appreciated that the technical benefits include, but are not limited to, dynamic threat identification, more accurate threat identification, and increased ease of generation, maintenance, and distribution of rules used to identify threats.

FIG. 1A illustrates an overview of an example system 100 for behavioral threat processing. As illustrated, system 100 is comprised of computing device 102, network 104, and security service 106. In an example, computing device 102 and security service 106 may communicate by way of network 104. As an example, computing device 102 and security service 106 may communicate using wired and/or wireless connections to network 104. While system 100 is illustrated as having one computing device 102, one network 104, and one security service 106, it will be appreciated that other examples may comprise alternate quantities of such elements.

Computing device 102 may be any of a variety of devices, including, but not limited to, a mobile computing device, a tablet computing device, a desktop or laptop computing device, an internet of things (IoT) computing device, a server computing device, or a distributed computing device. In some instances, it will be appreciated that computing device 102 may comprise one or more virtual devices and/or may comprise one or more operating systems that are executed as virtualized guests in which computing device 102 operates as a host. Computing device 102 is illustrated as comprising software instructions 108, application programming interface (API) 110, behavioral threat detection engine 112, virtual machine management engine 114, rule data store 116, and rule generation toolchain 122. In some examples, computing device 102 may form at least a part of an execution environment in which an operating system (OS) and/or other software may execute.

For example, software instructions 108 may execute on computing device 102. Software instructions 108 may be an application, a plugin, a script, a module, a driver, and/or a web application, among other examples. In some examples, software instructions 108 may be pre-compiled, compiled at runtime, or interpreted at runtime. In another example, software instructions 108 may execute in kernel mode, user mode, or a combination thereof.

Software instructions 108 may call one or more APIs that are available in the execution environment of computing device 102. For example, software instructions 108 may call API 110. In some examples, API 110 may enable software instructions 108 to engage in file system access or searching, network communication, process management, memory management, or communication with a specific hardware component (e.g., device drivers, sensor data access, etc.), among other functionality. In examples, API 110 may be provided by an OS of computing device 102. While examples are discussed herein with respect to API 110, it will be appreciated that, in other examples, other operations and/or other APIs may relate to any of a wide variety of software interfaces, commands, libraries, or services, among others, useable by software instructions 108 when executed by computing device 102.

As illustrated, computing device 102 further comprises behavioral threat detection engine 112 and virtual machine management engine 114. In an example, behavioral threat detection engine 112 and virtual machine management engine 114 provide threat detection, threat prevention, and/or threat mitigation using behavior rules according to aspects disclosed herein, among other functionality. In some examples, behavioral threat detection engine 112 processes one or more rules stored in rule data store 116 to determine the events for which a behavior rule should be triggered and/or events for which a rule should receive an event packet indicating the event occurred. Accordingly, behavioral threat detection engine 112 monitors for such events and, upon identifying a circumstance in which a rule should be triggered, causes a rule virtual machine to be initialized in which to execute the associated rule. In examples, a rule can specify one or more specific contexts for which events should be monitored, such that the rule is executed to specifically analyze one or more applications, processes, threads, network connections, and/or files, or any combination thereof, among other examples.

Virtual machine management engine 114 manages execution of rule virtual machines. For example, virtual machine management engine 114 may generate and/or maintain a state for executing rule virtual machines. In another example, virtual machine management engine 114 executes a behavior rule in a rule virtual machine. In some instances, at least a part of a rule execution state of a rule virtual machine is duplicated when an event specified by a set of rule instructions is matched, such that one instance of the rule virtual machine resumes execution of the rule instructions, while the other instance of the rule virtual machine continues waiting for matching events. Rule virtual machine duplication may enable the detection of behaviors that would otherwise go unmatched as a result of the occurrence of intermediate events, events having different parameters, and/or events that occur in a different order than was previously observed or expected, among other examples. Duplication may be configurable to selectively duplicate the rule virtual machine or it may be disabled altogether, among other examples. In examples, a time to live (TTL) rule instruction may be used to set an expiration value associated with a rule virtual machine, such that the rule virtual machine may be automatically terminated (or, in some instances, suspended) once an amount of time defined by the TTL rule instruction has elapsed. Eventually, virtual machine management engine 114 encounters a halt instruction, such that the rule virtual machine may be halted, thereby indicating that the rule has reached a determination. Example determinations include, but are not limited to, a match determination (indicating the presence of a malicious or potentially malicious behavior), a non-match determination (thereby exonerating the context of potential malicious behavior), or an indication that additional monitoring should be performed. It will be appreciated that, in other examples, a determination may indicate a processing error (e.g., processing has timed out, a syntax error has been encountered, etc.). In examples, an indication of the halt state is provided to behavioral threat detection engine 112, while, in other examples, behavioral threat detection engine 112 may periodically evaluate rule virtual machines managed by virtual machine management engine 114 to determine whether any rule virtual machines are halted.

Additional discussion of behavior rule execution and behavior rule virtual machine management techniques are described in more detail by U.S. application Ser. No. 16/366,065, titled "BEHAVIORAL THREAT DETECTION ENGINE," and U.S. application Ser. No. 16/366,098, titled "BEHAVIORAL THREAT DETECTION VIRTUAL MACHINE," both of which are hereby incorporated by reference in their entirety.

Computing device 102 is also illustrated as having rule data store 116, which stores one or more rules. In examples, rules may be added by a user of computing device 102 and/or may be downloaded from a security service, such as from rule data store 118 of security service 106. In some examples, rules in rule data store 116 may be stored as human-readable rule instructions using a domain-specific language, according to aspects described herein. In other examples, rules stored in rule data store 116 may be stored in a compiled format comprising instructions that are interpretable in a rule virtual machine. One or more rules may be packaged together, as illustrated by example behavior rule 160 described in greater detail with respect to FIG. 1C.

As discussed above, behavior rule instructions enable the processing of events and associated computations in order to identify a specific behavior. For example, an event code block is used in the set of rule instructions to indicate that an event should be identified before execution continues. One or more parameters associated with the event may be used to further define what constitutes a match. In examples, exact or inexact (e.g., wild cards, regular expressions, etc.) matching may be used. An event code block may specify more than one event. In some examples, a match may be defined as identifying at least one event in the code block (e.g., an "or" event code block), while, in other examples, a match may be defined as the identification of all events in the code block (e.g., an "and" event code block).

In another example, an event code block contains additional rule instructions, such that the additional rule instructions are associated with events within the event code block. As an example, a first set of additional rule instructions is associated with a first event, while a second set of additional rule instructions is associated with a second event. If the first event is identified, the first set of additional rule instructions is executed. By contrast, if the second event is identified, the second set of additional rule instructions is executed instead. Thus, the execution of a code block may be conditioned on the occurrence of a specific event.

A set of rule instructions may comprise a set of sequential event code blocks, thereby defining a series of events comprising a specific behavior. In some examples, a negative event match may be specified, such that an event match does not occur when the specified event. For example, an event code block may require a "file open" event, but may indicate that "file open" events relating to C:\WINDOWS\ should be ignored. It will be appreciated that other events relating to other platforms may be used according to aspects described herein.

Information relating to one or more matched events is available for processing by subsequent rule instructions, such as the type of event, one or more parameters associated with the event, what pattern was matched by a regular expression, and/or the application that caused the event, among other information. In some examples, a special "last_match" rule instruction is provided, wherein the return value for the last_match instruction comprises information relating to the last-matched event. It will be appreciated that "last_match" is provided as an example function name.

Rule generation toolchain 122 is further illustrated as part of computing device 102. In examples, aspects of rule generation toolchain 122 are used to generate a compiled rule, which may be referred to herein as a rule binary. For example, a set of rule instructions in human-readable form may be processed by rule generation toolchain 122 to define macros, replace operations, verify syntax, and/or generate a set of rule instructions in an intermediate language. In examples, the intermediate language may be an assembly language that uses operation codes ("opcodes") to represent human-readable instructions in a way that can be executed in a rule virtual machine. Rule generation toolchain 122 may assemble the intermediate language to generate a resulting rule binary. In some examples, event linking may occur, wherein an event hierarchy may be generated. The event hierarchy describes relationships between events and rules, for example, in instances where rules execute other rules (e.g., based on the occurrence of one or more events, based on processing performed by one or more rule instructions, etc.). Rule generation toolchain 122 may be used to generate a packaged behavior rule, which may comprise a set of behavior rules (e.g., in human-readable form, in an intermediate language, in compiled form, etc.), configuration information, event registration data relating to an event hierarchy, launch data, metadata, and/or other information. Additional aspects of rule generation toolchain 122 are discussed in greater detail with respect to FIG. 1B.

System 100 further comprises security service 106. In an example, security service 106 may be a service for providing computer security for one or more computing devices (e.g., computing device 102). It will be appreciated that while security service 106 is illustrated as comprising elements 118-120, fewer, additional, or alternative elements may be used, or security service 106 may be provided as part of a distributed computing device or a cloud-computing system. In some examples, various aspects described above with respect to computing device 102 may additionally or alternatively be performed by security service 106. As illustrated, security service 106 further comprises rule data store 118 and backend threat processor 120. In some examples, behavioral threat detection engine 112 and/or one or more rules in rule data store 116 may be provided by and/or communicate with security service 106 in order to provide computer security to computing device 102 according to aspects described herein.

In an example, rule data store 118 may store one or more rules for access by or distribution to various computing devices, such as computing device 102, thereby updating or improving the security offered by behavioral threat detection engine 112. In some instances, rules in rule data store 118 may be created by security service 106, while, in other examples, rules may be created by one or more third parties (e.g., security researchers, companies, institutions, etc.). As another example, rules created by a user of computing device 102 may be provided to security service 106 by behavioral threat detection engine 112, thereby enabling security service 106 to crowd-source and redistribute rules. Rules stored and/or distributed by rule data store 118 may be generated using a rule generation toolchain, such as rule generation toolchain 122 of computing device 102. In some instances, security service 106 may distribute the rule generation toolchain. As a result of defining a behavior as a behavior rule, aspects of the present disclosure enable any of a variety of people, companies, or other entities to define rules that are useable to detect malicious behaviors rather than merely applying a rigid, pattern-based analysis as has historically been used in malware detection.

FIG. 1B illustrates an overview of an example rule generation toolchain 122 for generating a compiled behavior rule. As illustrated, rule generation toolchain 122 comprises preprocessor engine 124, compiler engine 126, assembler engine 128, event linker engine 130, matching rule processor 131, and packager engine 132. While rule generation toolchain is illustrated as comprising elements 124-132, it will be appreciated that, in other examples, a rule generation toolchain may be comprised of additional or fewer elements. Further, in some examples, certain aspects may be performed by a different component of a computing device, such as behavioral threat detection engine 112 of computing device 102 and/or backend threat processor 120 of security service 106.

As described above, a set of rule instructions describes one or more behaviors and may comprise computations, comparisons, and other instructions relating to events, such that continued execution of the rule instructions may be predicated on the occurrence (or lack thereof) of one or more events. Preprocessor engine 124 performs a variety of operations to preprocess human-readable rule instructions. For example, preprocessor engine 124 may identify one or more files for inclusion (e.g., headers, libraries, etc.), evaluate macro definitions (e.g., macro definitions, macro un-definitions, conditional definitions, etc.), and/or expand macros. While example preprocessor operations are described herein, it will be appreciated that other preprocessor operations may be performed by preprocessor engine 124 without departing from the spirit of this disclosure.

Compiler engine 126 may parse rule instructions, perform semantic analysis, and/or generate intermediate language output. In some examples, compiler engine 126 processes rule instructions that have been preprocessed by preprocessor engine 124. As an example, compiler engine 126 parses a set of rule instructions to generate an abstract syntax tree. The abstract syntax tree may be used to perform semantic analysis, wherein compiler engine 126 verifies the syntax of the set of rule instructions to identify errors, generate warnings, determine variable storage locations, correlate variable usage, and check the correctness of event prototypes, among other examples. In another example, compiler engine 126 uses the abstract syntax tree to generate intermediate language output. In examples, the intermediate language is an assembly language that uses opcodes to represent human-readable instructions in a way that can be executed in a rule virtual machine.

The intermediate language may comprise one or more opcodes relating to an event rule instruction, which may cause execution of the rule virtual machine to pause while waiting for a matching event. For example, "event" opcodes may specify a positive event match, a negative event match, and/or one or more parameters associated with the specified event. Parameters may be specified as positive or negative matches using exact matching (e.g., numerical values, strings, ranges, sets of matches, etc.) and/or inexact matching (e.g., regular expressions, wild cards, etc.). In another example, the intermediate language defines one or more "halt" opcodes relating to halt rule instructions, such that a behavior rule is able to indicate a specific determination has been reached by the rule. Such a determination need not be made at the end of a rule, and a halt instruction may instead be used at any point within the rule. Example determinations include, but are not limited to, a match determination, a non-match determination, or an indication that additional monitoring should be performed. In examples, absent an explicit declaration, compiler engine 126 automatically inserts an implicit halt opcode at the end of execution for the rule, thereby automatically indicating that a rule has or has not been matched.

In some examples, the intermediate language enables the definition of options that are distinct from executable rule instructions and instead specify various aspects relating to the behavior rule. Such aspects may affect the generation of the rule binary. Example options include, but are not limited to, strings, numbers, or other data that should be stored in a read-only section of a rule binary, context information indicating one or more contexts for which a rule should be executed, a friendly name and a description defining human-readable descriptive information for the rule (e.g., which may be used to identify the rule, be used for logging purposes, etc.), a heuristic value indicating a level of suspiciousness associated with a scenario matching the rule (e.g., a higher heuristic value indicates a matched behavior is more suspicious than a lower heuristic value), and/or event registration data defining one or more events processed by the rule and/or events for which the rule should be launched, among other examples. In examples, one or more heuristic values are evaluated using a threshold in order to determine when a rule has made a determination and/or when an action should be taken. In another example, the intermediate language output may retain comments from the human-readable set of rule instructions, so as to facilitate easier human understanding and more efficient debugging of the intermediate language representation of the rule instructions.

Rule generation toolchain 122 is illustrated as further comprising assembler engine 128. In examples, assembler engine 128 uses output generated by compiler engine 126 and preprocessor engine 124 to generate a compiled rule binary. For example, assembler engine 128 processes the intermediate language output generated by compiler engine 126 to generate byte code that can be processed by a behavior engine (e.g., executed in a rule virtual machine).

Event linker engine 130 may evaluate the generated rule binary to determine relationships between the rule binary and one or more other rules, identify (and, in some examples, resolve) cycles in a launch chain, and/or generate an event hierarchy indicating which events are processed by which rules. For example, if the compiled rule binary causes the execution of another rule, event linker engine 130 may identify this and other such relationships. As another example, event linker engine 130 evaluates a launch chain (e.g., a set of rules in which one rule causes the execution one or more other rules) to determine whether any cycles are present. If a cycle is identified, event linker engine 130 may generate a warning or error with respect to the identified cycle. In another example, event linker engine 130 may automatically resolve the identified cycle. Event linker engine 130 may generate an event hierarchy to determine which events should be adopted from related (e.g., child) behavior rules. For example, if a first rule launches a second rule that processes event A, the first rule adopts event A such that the generated event hierarchy will indicate that the first rule also processes event A, even if the first rule does not comprise any rule instructions relating to event A. As a result, events relating to event A are added to the event queue for the first rule, such that when the second rule is executed in a rule virtual machine by the first rule, events relating to event A from the first rule are propagated to the execution of the second rule.

Rule generation toolchain 122 further comprises matching rule processor 131. In examples, matching rule processor 131 processes one or more matching rules, such that matching rules may later be evaluated in order to determine when to execute an associated behavior rule. Similar to a behavior rule, a matching rule may be defined as a set of human-readable instructions, in an intermediate language, or in a binary format, or any combination thereof. Thus, in examples, matching rule processor 131 may preprocess, compile, and/or assemble one or more matching rules as part of the rule binary generation process. In some examples, matching rules are processed prior to, during, or after behavior rules are processed. As an example, matching rule processor 131 processes a matching rule to generate a binary representation of the matching rule, which subsequently causes an associated behavior rule to be processed as described above. In another example, matching rule processor 131 processes one or more matching rules when a behavior rule is packaged as part of generating a packaged behavior rule. In some examples, a behavior rule may be associated with multiple matching rules and, similarly, multiple matching rules may be associated with a behavior rule. In some instances, a matching rule receives an indication (e.g., one or more event packets, event types, etc.) of events that match a behavior rule, thereby causing the behavior rule to be executed.

In some examples, a matching rule relates to higher-level system events as compared to the lower-level (e.g., API-based, interrupt-based, etc.) events that are processed by behavior rules. For example, a matching rule may be defined with respect to a file open operation, whereas a behavior rule processes the API call associated with opening the file. It will be appreciated that any of a variety of system events may be described in a matching rule, including, but not limited to, a file write event, a file delete event, a process creation event, or an event associated with opening and/or editing a registry key, etc. In examples, a matching rule describes multiple events (e.g., using Boolean logic, a hierarchical structure, etc.). For example, a parent matching rule describes a first event and a child matching rule describes a second event, such that the child matching rule is evaluated after the occurrence of the first event, and a match is identified after matching both the parent and child matching rules. It will be appreciated that, in other examples, one or more other operations occur once a matching rule is matched, in addition or as an alternative to executing a behavior rule. As an example, a matching rule may cause a process or parent process to be killed, generate a log entry, request user input, or mark a process as benign, among other examples. In some examples, a matching rule may have an associated mode, wherein the matching rule may be enabled, disabled, or marked as silent. In an example where the matching rule is marked as silent, associated processing may occur without requesting user input or generating an alert, among other examples.

Packager engine 132 of rule generation toolchain 122 packages behavior rules according to aspects described herein. In examples, behavior rule 160, discussed in greater detail with respect to FIG. 1C, is a behavior rule package generated at least in part by packager engine 132. In some examples, packager engine 132 associates a matching rule (e.g., as may be generated by matching rule processor 131) with a behavior rule. Packager engine 132 may use a configuration file to generate a behavior rule package. The configuration file may be in a JavaScript Object Notation (JSON) format, an Extensible Markup Language (XML) format, or in an encoded binary format, among other examples. It will be appreciated that, in another example, configuration information is stored in a database or provided as command line arguments, among other techniques. Example configuration components include, but are not limited to, global options, rule categories, exclusion rules, and a list of rules that are included in the rule package.

Example global options include, but are not limited to, a magic value (e.g., a number identifying the rule/executable format, a globally unique identifier, etc.), one or more version numbers, and an indication as to whether all processes should be monitored. It will be appreciated that, in some examples, the indication may instead comprise one or more contexts that should be monitored. Such options may affect information stored in the header of a generated rule package.

In another example, a rule category defines one or more behavior rules that should be launched under a specific set of circumstances. For instance, a list of applications browser applications (e.g., "firefox.exe," "chrome.exe," etc.) is specified, such that when any one of the applications is launched, an associated rule is launched in a behavior virtual machine. It will be appreciated that any of a variety of matching techniques may be used, including, but not limited to, exact matching, inexact matching, as well as matching based on process name, window title, file name, etc. Information relating to rule categories may be stored as launch data in a behavior rule package. Conversely, an exclusion rule may specify an instance in which an associated rule should not be launched. Returning to the browser application example above, an exclusion rule may specify criteria in which the associated rule should not be launched even when a browser application is launched. Example exclusion rules include, but are not limited to, criteria relating to a calling process, a window title, and/or execution parameters.

The list of included rules specifies one or more behavior rules that are included in the behavior rule package. In examples, the list of included rules is used to perform error checking, wherein the list is evaluated to identify rules specified in the above-discussed rule categories but not listed in the list of included rules and/or to identify rules listed in the list of included rules but not included in any rule categories. In another example, the list of included rules is used by packager engine 132 to determine which rules to include in the behavior rule package.

FIG. 1C illustrates an overview of an example behavior rule 160 according to aspects described herein. For example, behavior rule 160 may be generated by a rule generation toolchain, such as rule generation toolchain 122 in FIG. 1A and/or may be used by a behavioral threat detection engine, such as behavioral threat detection engine 112. Behavior rule 160 may have been packaged by a packager engine according to aspects described herein. As illustrated, behavior rule 160 is comprised of header 162, metadata 164, rule instructions 166, read-only data 168, event registration data 170, and launch data 172. While behavior rule 160 is illustrated as comprising elements 162-172, it will be appreciated that, in some examples, additional, fewer, or alternative elements may be used. For example, event registration data 170 and metadata 164 may be parts of header 162.

Header 162 may contain information including, but not limited to, a magic value, one or more offsets and/or sizes associated with elements 164-172, one or more checksums, a version, a heuristic value, one or more contexts for which rule 160 applies, one or more matching rules, and/or a globally unique identifier. In examples, metadata 164 comprises information about the rule that may facilitate logging. For instance, such information may include, but is not limited to, another magic value, compile-time information, a text-based name for the rule (e.g., in addition to or as an alternative to a globally unique identifier), and/or a description for the rule. In some examples, aspects of header 162 are determined based on options processed by compiler engine 126 and/or global options processed by packager engine 132, as discussed above with respect to FIG. 1B.

Rule instructions 166 comprises one or more rule instructions according to aspects described herein. In examples, at least some of the rule instructions may be machine-readable instructions, as may be generated by compiler engine 126 and/or assembler engine 128 of rule generation toolchain 122 in FIG. 1B. It will be appreciated that, in other examples, at least some of the rule instructions may be human-readable instructions, as may be interpreted by a parser. Read-only data 168 may comprise information useable by rule instructions 166 during execution (e.g., strings, numbers, etc.). In some examples, at least some of the data included in read-only data 168 is determined based on options processed by compiler engine 126 and/or identified when compiler engine 126 is evaluating a set of rule instructions, as discussed above with respect to FIG. 1B.

Event registration data 170 may comprise information relating to one or more events that rule instructions 166 processes. For instance, event registration data 170 may comprise one or more records relating to events for which rule 160 should be launched and/or events that rule 160 processes. In examples, aspects of event registration data 170 are generated by event linker engine 130 of rule generation toolchain 122, such as the event hierarchy described above. Launch data 172 may comprise one or more records relating to rules that rule 160 may launch. For instance, rule 160 may launch a rule as a result of an event occurring, a determination being made (e.g., a halt state being reached), or after a predetermined amount of time, among other examples. Information stored as part of launch data 172 may relate to a launch chain generated/evaluated by event linker engine 130 of rule generation toolchain 122, as was discussed above with respect to FIG. 1B. It will be appreciated that aspects of rule 160 are discussed herein as an example, and that any of a variety of other information and rule formats may be used.

FIG. 2 illustrates an overview of an example method 200 for generating a packaged behavior rule from a set of rule instructions. In an example, aspects of method 200 may be performed by rule generation toolchain 122 of computing device 102 discussed above with respect to FIGS. 1A and 1B. Method 200 begins at operation 201, where one or more matching rules are processed. In examples, matching rules are processed by a matching rule processor, such as matching rule processor 131 of rule generation toolchain 122 in FIG. 1B. Processing the matching rules may comprise preprocessing, compiling, and/or assembling one or more matching rules. A matching rule may be defined as a set of human-readable instructions, in an intermediate language, or in a binary format, or any combination thereof. As described above, a matching rule may define one or more behavior rules that are executed in a rule virtual machine when the matching rule is matched. Accordingly, the following operations of method 200 process rule instructions for associated behavior rules in order to generate packaged behavior rule binary.

At operation 202, a set of behavior rule instructions are preprocessed. In examples, the rule instructions are preprocessed by a preprocessor engine, such as preprocessor engine 124 of rule generation toolchain 122 in FIG. 1B. Preprocessing may comprise identifying one or more files for inclusion, evaluating macro definitions, and/or expanding macros. While example preprocessor operations are described herein, it will be appreciated that other preprocessor operations may be performed by preprocessor engine 124 without departing from the spirit of this disclosure.

Flow progresses to operation 204, where the preprocessed rule instructions are compiled to generate an intermediate language output. In an example, the rule instructions are compiled using a compiler engine, such as compiler engine 126 of rule generation toolchain 122 in FIG. 1B. In some examples, compiling the preprocessed rule instructions comprises parsing the rule instructions to generate an abstract syntax tree and performing semantic analysis of the abstract syntax tree. For example, the syntax of the rule instructions is verified to identify errors, generate warnings, determine variable storage locations, correlate variable usage, and/or check the correctness of event prototypes. The abstract syntax tree is used to generate intermediate language output for the rule instructions. As an example, the intermediate language output is an assembly language in which opcodes are used to represent the human-readable rule instructions in a way that can be executed in a rule virtual machine. The intermediate language output may comprise one or more opcodes relating to an event rule instruction and/or a match rule instruction according to aspects described herein.

At operation 206, the intermediate language output is assembled in order to generate a compiled rule binary. In an example, an assembler engine is used to generate the compiled rule binary, such as assembler engine 128 of rule generation toolchain 122 in FIG. 1B. The intermediate language output is assembled in order to generate byte code that can be processed by a behavior engine (e.g., executed in a rule virtual machine). The dashed arrow from operation 206 to operation 202 indicates that one or more of operations 202-206 may be performed multiple times, such as in instances where there are multiple behavior rules defined in the same file or set of files. For example, interrelated rules may be described as a group, such that the processing of each rule may be performed at operations 202-206.

Moving to operation 208, an event-linked rule binary is generated from the compiled output of operation 206. In examples, event linking is performed using an event linker engine, such as event linker engine 130 of rule generation toolchain 122 in FIG. 1B. As an example, the rule binary (or, in the case of multiple behavior rules, rule binaries) generated at operation 206 is evaluated to determine relationships between interrelated rules, identify (and, in some examples, resolve) cycles in a launch chain, and/or generate an event hierarchy indicating which events are processed by which rules.

At operation 210, a packaged behavior rule is generated. In examples, the packaged behavior rule comprises the one or more rule binaries that were generated as a result of operations 202-206 discussed above. In some examples, the behavior rule package is of a format similar to example behavior rule 160 discussed above with respect to FIG. 1C. In some instances, the generation may comprise evaluating configuration, as may be stored in a file or a database, provided as one or more command line arguments, or accessed from a variety of other sources. The generated package may comprise information generated or evaluated at operations 201-208, including, but not limited to, processed matching rules, options processed when generating the intermediate language output, as well as an event hierarchy and/or launch cycle information generated at operation 208. In examples, generating the packaged behavior rule comprises associating one or more matching rules with the packaged behavior rule. In some examples, one or more matching rules processed at operation 201 are stored as part of the packaged behavior rule (e.g., as part of the metadata, as a separate element within the packaged behavior rule, etc.). In other examples, matching rules generated at operation 201 are stored separately from the packaged behavior rule. Flow terminates at operation 210.

The generated behavior rule package may be distributed (e.g., to computing device 102 and/or security service 106 in FIG. 1A, etc.) for use with a behavioral threat detection engine, such as behavioral threat detection engine 112. The behavioral rule package may be executed in a rule virtual machine accordingly. It will be appreciated that while examples herein are described with respect to compiling and packaging a set of rule instructions for execution in a virtual machine, similar aspects may be used to package a set of rule instructions for parsing by a behavioral threat detection engine. For example, human-readable rule instructions may be distributed in place of compiled rule instructions, wherein operations similar to operations 202, 208, and/or 210 may be used to package the rule instructions into a behavior rule package accordingly.

Figure 3:
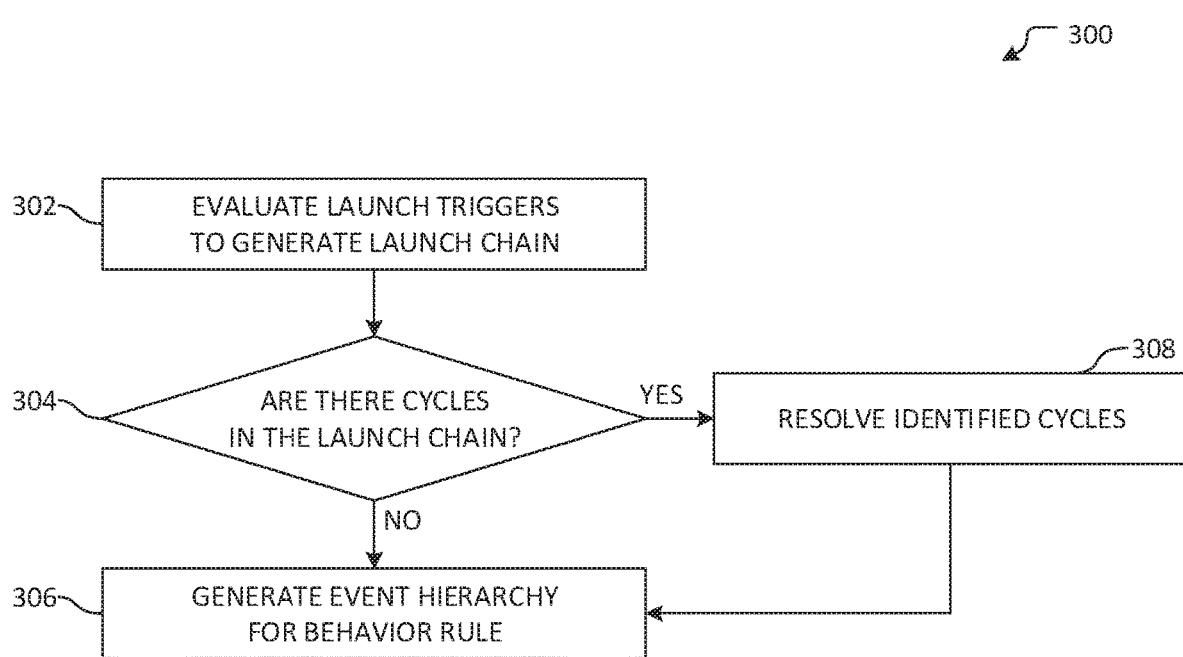
FIG. 3 illustrates an overview of an example method for processing launch triggers for a behavior rule.

FIG. 3 illustrates an overview of an example method 300 for processing launch triggers for a behavior rule. In examples, aspects of method 300 are performed by an event linker engine, such as event linker engine 130 of rule generation toolchain 122 in FIG. 1B. In other examples, aspects of method 300 may be performed at operation 208 discussed above with respect to method 200 in FIG. 2.

Method 300 begins at operation 302, where launch triggers for a behavior rule are evaluated to generate a launch chain. In an example, the evaluation may be performed on a set of human-readable rule instructions, on intermediate language output (e.g., as may be generated by a compiler engine), or on a compiled rule binary (e.g., as may be generated by assembler engine 128). Evaluating launch triggers may comprise iterating through rule instructions to identify instances in which a rule is launched by another rule. In another example, the evaluation comprises determining which events cause a rule to be launched. Thus, the launch chain describes a set of rules in which one rule causes the execution one or more other rules.

At determination 304, it is determined whether there are cycles in the launch chain. The determination may comprise evaluating each element in the launch chain to determine whether any elements have been encountered previously in the launch chain. As an example, if rule A launches rule B, which subsequently launches rule C, the launch chain may indicate A=>B=>C. However, if C subsequently launches A (e.g., A=>B=>C=>A), this may be determined to be a cycle at determination 304.

Accordingly, if it is determined at operation 304 that one or more cycles are present in the launch chain, flow branches "YES" to operation 308, where the identified cycles are resolved. As an example, resolving a launch cycle may comprise omitting the instruction that caused the cycle. Returning to the above example, the instruction launching rule A from rule C may be omitted. In another example, an error or warning may be generated, such that a user may manually resolve the launch cycle. Flow then progresses to operation 306, which is discussed below.

If, however, it is determined that there are not cycles in the launch chain, flow instead branches "NO" to operation 306, where an event hierarchy is generated. As discussed above, the event hierarchy indicates which events are processed by which rules. Thus, it may be determined which events should be adopted from related behavior rules. As an example, if a first rule launches a second rule that processes event A, the generated event hierarchy will indicate that the first rule also processes event A. As a result, when the first rule is executed in a rule virtual machine, events relating to event A are added to the event queue for the first rule, such that the events may be propagated to the execution of the second rule when it is launched by the first rule. Thus, if there are multiple interrelated rules that are launched as a result of various events, the generated event hierarchy identifies events for which subsequent rules in the launch chain depend and/or process. Flow terminates at operation 306.

Figure 4:
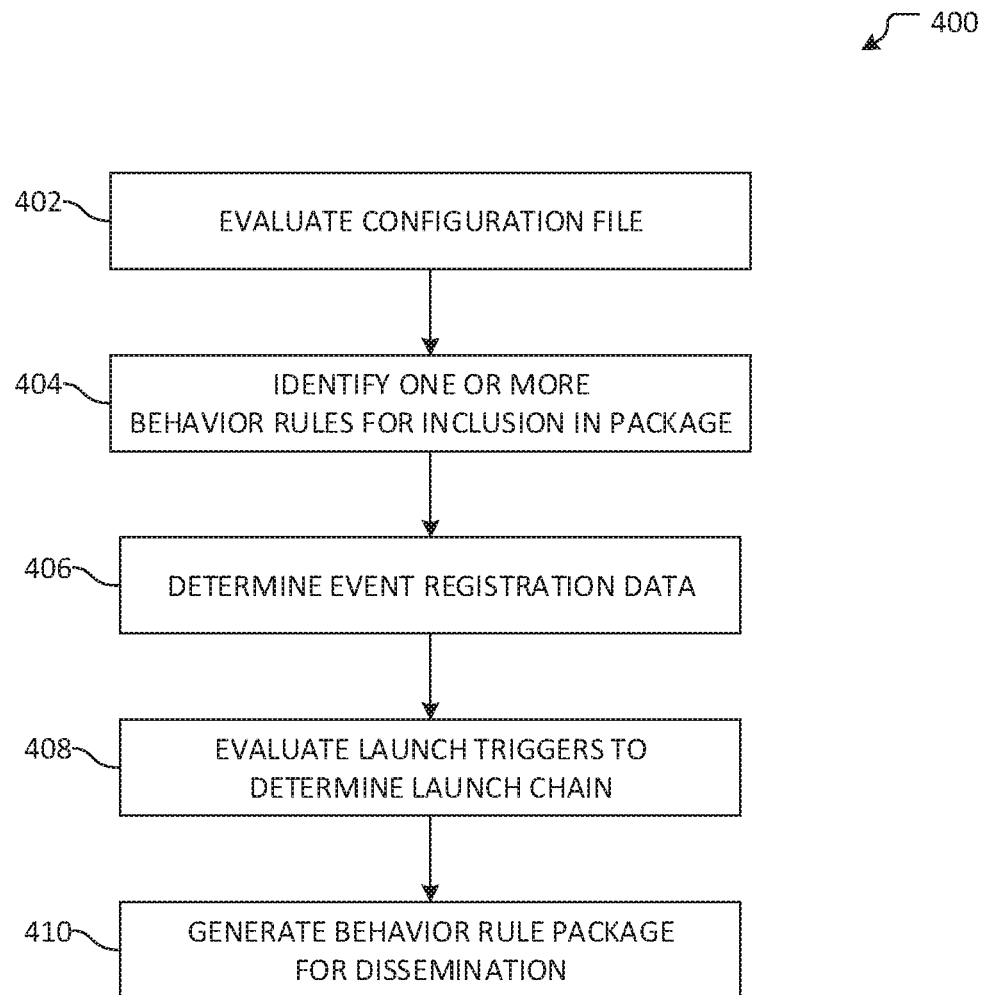
FIG. 4 illustrates an overview of an example method for generating a package for a set of behavior rules.

FIG. 4 illustrates an overview of an example method 400 for generating a packaged behavior rule for a set of behavior rules. In an example, aspects of method 400 are performed by a packager engine, such as packager engine 132 of rule generation toolchain 122 in FIG. 1B. In other examples, aspects of method 400 may be performed at operation 210 discussed above with respect to method 200 in FIG. 2.

Method 400 begins at operation 402, where a configuration file is evaluated. The configuration file may be in a JSON format, an XML format, or a binary format, among other examples. It will be appreciated that, in another example, configuration information is stored in a database or provided as command line arguments, among other techniques. Example configuration components include, but are not limited to, global options, rule categories, exclusion rules, and a list of rules that are included in the rule package, as discussed above. The evaluated information may be included as part of the header and/or may affect aspects of the package generation as described herein.

At operation 404, one or more behavior rules are identified for inclusion in the behavior rule package. Identifying the behavior rules may comprise evaluating rules defined in the same file, listed in the same directory, and/or evaluating which rules are interdependent. In another example, the list of rules in the evaluated configuration file is used to identify the behavior rules for inclusion. In some examples, a launch chain generated by an event linker engine may be evaluated at operation 404 to identify rules for inclusion. The behavior rules may be compiled, in an intermediate language, or in human-readable form, or any combination thereof.

Flow progresses to operation 406, where events registration data is determined. In examples, an event hierarchy (e.g., as may be generated by an event linker engine) is evaluated to generate event registration data that identifies events that launch and/or are processed by the identified behavior rules. In another example, rule instructions associated with the identified behavior rules are evaluated to identify instances of event instructions relating to one or more events.

Moving to operation 408, launch triggers are evaluated to determine a launch chain associated with the identified behavior rules. In examples, the launch chain may have been determined by an event linker engine, as discussed above with respect to method 300 in FIG. 3 and event linker engine 130 in FIG. 1B. In other examples, interdependencies among the identified behavior rules are evaluated in order to determine the rules that launch and/or are launched by other rules, thereby generating a launch chain for the identified behavior rules.

At operation 410, a behavior rule package is generated. In an example, the format of the behavior rule package is similar to that of behavior rule 160 in FIG. 1C. For example, a header and/or metadata for the behavior rule package may be generated and may comprise information including, but not limited to, a magic value, one or more offsets and/or sizes associated with other elements of the behavior rule package, one or more checksums, a version, a heuristic value, one or more contexts for which the identified rules apply, information used for debugging or logging purposes, one or more matching rules, and/or a globally unique identifier.

As another example, rule instructions associated with the identified behavior rules are included in the behavior rule package, wherein the included rule instructions may be human-readable instructions, intermediate language instructions, and/or compiled byte code, or any combination thereof according to aspects described herein. Some of the rule instructions may refer to, process, or otherwise access read-only data, which may also be stored in the generated rule behavior package. Similarly, one or more matching rules incorporated into the behavior rule package may be stored as human-readable instructions, intermediate language instructions, and/or compiled byte code, or any combination thereof.

Information determined at operations 406 and 408 is also incorporated into the behavior rule package. For example, event registration data determined at operation 406 is included in the generated behavior rule package, such that the events relevant to the identified rules in the rule package are easily identifiable (e.g., by a behavioral threat detection engine, by a virtual machine management engine, etc.). As another example, information relating to the launch chain determined at operation 408 is incorporated into the behavior rule package, thereby enabling the transfer of relevant events from a parent rule to one or more child rules accordingly when the parent rule causes the instantiation of the child rule. Flow terminates at operation 410.

Figure 5:
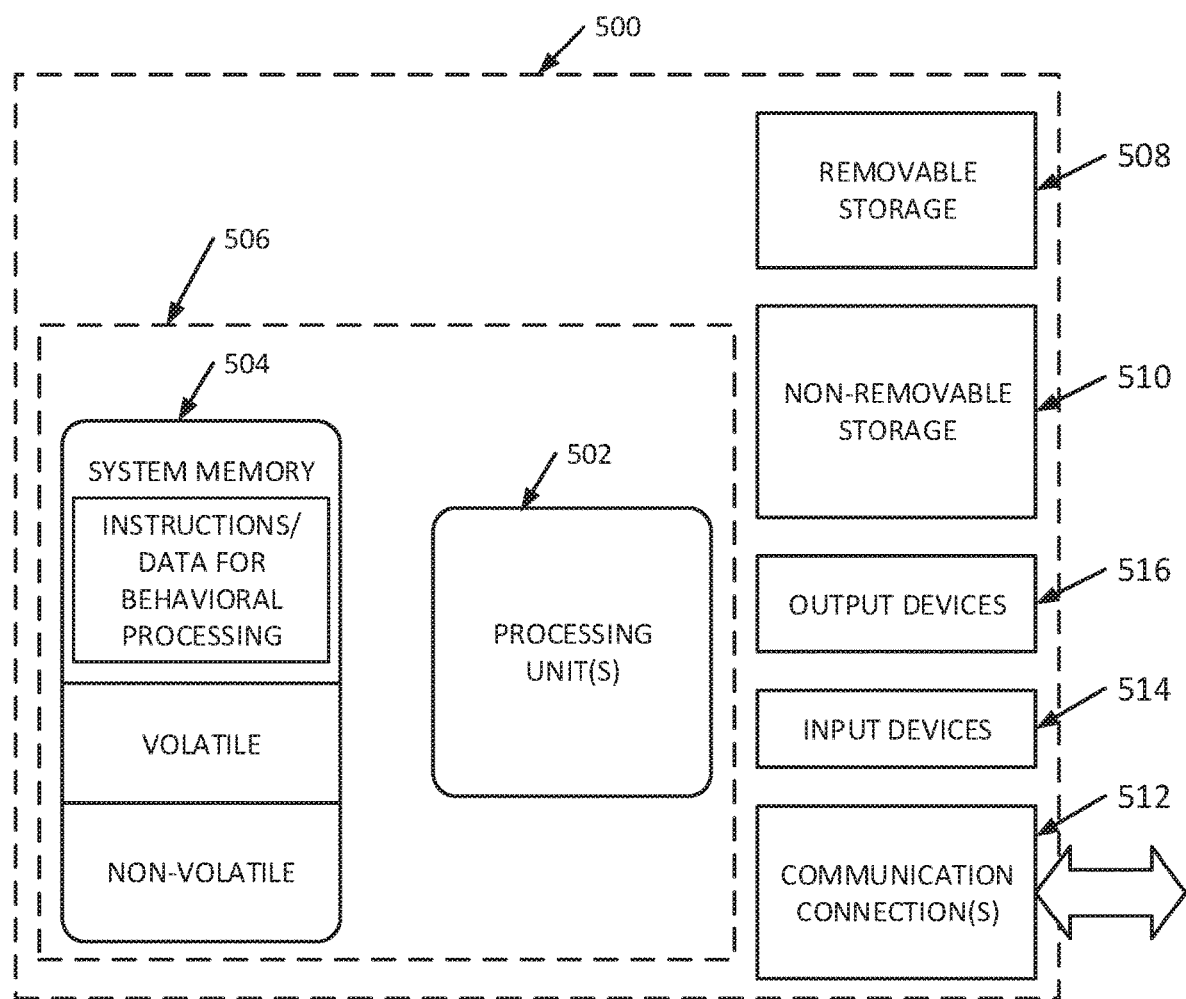
FIG. 5 illustrates one example of a suitable operating environment in which one or more of the present embodiments may be implemented.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, one or more rules, an event type index, one or more configuration files, one or more executables relating to a rule generation toolchain, instructions to perform the methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

As will be understood from the foregoing disclosure, one aspect of the technology relates to a system comprising: at least one processor; and memory storing instructions that, when executed by the at least one processor, causes the system to perform a set of operations. The set of operations comprises: generating, from a set of rule instructions for a first behavior rule to identify a behavior, an intermediate language output, wherein the intermediate language output is a representation of the set of rule instructions and comprises at least one event operation code and at least one halt operation code, wherein the halt operation code indicates a determination with respect to the behavior; compiling the intermediate language output to generate a behavior rule binary; generating an event hierarchy for the generated behavior rule binary, wherein the event hierarchy comprises an indication of one or more events processed by the behavior rule binary; and distributing the generated behavior rule binary and information relating to the generated event hierarchy to a computing device, wherein the generated behavior rule binary is executable in a rule virtual machine of the computing device. In an example, the set of rule instructions comprises an instruction to launch a second behavior rule, and the set of operations further comprises: generating a launch chain for the behavior rule binary, wherein the launch chain comprises an indication that the generated behavior rule binary launches the second behavior rule. In another example, generating the launch chain further comprises: evaluating the launch chain to determine whether a launch cycle is present in the launch chain; and when it is determined that a launch cycle is present in the launch chain, generating an indication of the launch cycle. In a further example, distributing the generated behavior rule binary further comprises distributing a second rule binary for the second behavior rule and information relating to the generated launch chain. In yet another example, distributing the generated behavior rule binary and information relating to the generated event hierarchy comprises distributing a packaged behavior rule, wherein the packaged behavior rule comprises a header, the generated behavior rule binary, and the information relating to the generated event hierarchy. In a further still example, the packaged behavior rule further comprises a second rule binary for a second behavior rule. In another example, the packaged behavior rule further comprises information relating to a launch chain for the first behavior rule and the second behavior rule.

In another aspect, the technology relates to a method for generating a packaged behavior rule for behavioral threat detection. The method comprises: processing a first set of rule instructions to generate a first behavior rule binary; processing a second set of rule instructions to generate a second behavior rule binary; generating an event hierarchy for the first behavior rule binary and the second behavior rule binary, wherein the event hierarchy comprises an indication of one or more events processed by the first behavior rule binary and the second behavior rule binary; generating a launch chain for the first behavior rule binary and the second behavior rule binary, wherein the launch chain comprises an indication that the first behavior rule binary launches the second behavior rule binary; generating a packaged behavior rule comprising the first behavior rule binary, the second behavior rule binary, information relating to the event hierarchy, and information relating to the launch chain; and distributing the generated packaged behavior rule to a computing device. In an example, generating the launch chain further comprises: evaluating the launch chain to determine whether a launch cycle is present in the launch chain; and when it is determined that a launch cycle is present in the launch chain, generating an indication of the launch cycle. In another example, generating the launch chain further comprises: evaluating the launch chain to determine whether a launch cycle is present in the launch chain; and when it is determined that a launch cycle is present in the launch chain, automatically resolving the launch cycle in the launch chain. In a further example, processing the first set of rule instructions to generate a first behavior rule binary comprises: generating, from the first set of rule instructions, an intermediate language output, wherein the intermediate language output is a representation of the first set of rule instructions and comprises at least one event operation code and at least one halt operation code, wherein the halt operation code indicates a determination with respect to a behavior; and compiling the intermediate language output to generate the first behavior rule binary. In yet another example, the packaged behavior rule further comprises a header and read-only data for at least one of the first behavior rule and the second behavior rule. In a further still example, distributing the generated packaged behavior rule to a computing device comprises providing the generated packaged behavior rule to a security service for further distribution.

In a further aspect, the technology relates to a method for processing a behavior rule for behavioral threat detection. The method comprises: generating, from a set of rule instructions for a first behavior rule to identify a behavior, an intermediate language output, wherein the intermediate language output is a representation of the set of rule instructions and comprises at least one event operation code and at least one halt operation code, wherein the halt operation code indicates a determination with respect to the behavior; compiling the intermediate language output to generate a behavior rule binary; generating an event hierarchy for the generated behavior rule binary, wherein the event hierarchy comprises an indication of one or more events processed by the behavior rule binary; and distributing the generated behavior rule binary and information relating to the generated event hierarchy to a computing device, wherein the generated behavior rule binary is executable in a rule virtual machine of the computing device. In an example, the set of rule instructions comprises an instruction to launch a second behavior rule, and the method further comprises: generating a launch chain for the behavior rule binary, wherein the launch chain comprises an indication that the generated behavior rule binary launches the second behavior rule. In another example, generating the launch chain further comprises: evaluating the launch chain to determine whether a launch cycle is present in the launch chain; and when it is determined that a launch cycle is present in the launch chain, generating an indication of the launch cycle. In a further example, distributing the generated behavior rule binary further comprises distributing a second rule binary for the second behavior rule and information relating to the generated launch chain. In yet another example, distributing the generated behavior rule binary and information relating to the generated event hierarchy comprises distributing a packaged behavior rule, wherein the packaged behavior rule comprises a header, the generated behavior rule binary, and the information relating to the generated event hierarchy. In a further still example, the packaged behavior rule further comprises a second rule binary for a second behavior rule. In another example, the packaged behavior rule further comprises information relating to a launch chain for the first behavior rule and the second behavior rule.

As will be further understood from the foregoing disclosure, one aspect of the technology relates to a system comprising: at least one processor; and memory storing instructions that, when executed by the at least one processor, causes the system to perform a set of operations. The set of operations comprises: encountering a first instruction of a behavior rule indicating at least one event, wherein the at least one event is associated with a behavior; in response to encountering the first instruction, pausing execution; when an event occurrence associated with the at least one event is identified, resuming execution; processing, based on a second instruction of the behavior rule, information associated with the event occurrence; encountering a third instruction of the behavior rule, wherein the third instruction is a halt instruction indicating a determination as to the behavior has been made; and performing, by the system, an action in response to the halt instruction. In an example, halt instruction indicates a positive match determination as to the behavior, and performing the action comprises taking a remedial action based on the determination as to the behavior. In another example, the halt instruction indicates a negative match determination as to the behavior, and performing the action comprises continuing normal system execution. In a further example, the halt instruction indicates additional monitoring should be performed, and performing the action comprises performing additional monitoring for the behavior. In yet another example, the event occurrence indicates that an event of the at least one event occurred. In a further still example, the event occurrence indicates that every event of the at least one event occurred. In another example, first instruction indicating the at least one event further comprises an indication of a parameter for the at least one event, and the event occurrence associated with the at least one event indicates that an event having the parameter indicated by the first instruction occurred.

In another aspect, the technology relates to another system comprising at least one processor; and memory storing instructions that, when executed by the at least one processor, causes the system to perform a set of operations. The set of operations comprises: encountering a first instruction of a behavior rule indicating at least one event and a parameter for the at least one event, wherein the at least one event is associated with a behavior; in response to encountering the first instruction, pausing execution; when an event occurrence associated with the at least one event is identified at a computing device and the event occurrence associated with the at least one event indicates that an event having the parameter indicated by the first instruction occurred, resuming execution; processing, based on a second instruction of the behavior rule, information associated with the event occurrence; encountering a third instruction of the behavior rule, wherein the third instruction is a halt instruction indicating a determination as to the behavior has been made; and performing, by the computing device, an action in response to the halt instruction. In an example, the parameter is defined an exact match for an event parameter of the at least one event. In another example, the parameter is defined as a regular expression indicating an inexact match for an event parameter of the at least one event. In a further example, the information associated with the event occurrence comprises the parameter that matched the regular expression indicating the inexact match for the event parameter of the at least one event. In yet another example, the halt instruction indicates a determination selected from the group of determinations consisting of: a positive match determination as to the behavior; a negative match determination as to the behavior; and an inconclusive determination indicating that additional monitoring should be performed. In a further still example, the first instruction further comprises a negative indication, which indicates a negative event match that is not the event occurrence for the at least one event.

In a further aspect, the technology relates to a method for executing a behavior rule to perform behavioral threat detection. The method comprises: encountering a first instruction of a behavior rule indicating at least one event, wherein the at least one event is associated with a behavior; in response to encountering the first instruction, pausing execution; when an event occurrence associated with the at least one event is identified, resuming execution; processing, based on a second instruction of the behavior rule, information associated with the event occurrence; encountering a third instruction of the behavior rule, wherein the third instruction is a halt instruction indicating a determination as to the behavior has been made; and performing, by the system, an action in response to the halt instruction. In an example, the halt instruction indicates a positive match determination as to the behavior, and performing the action comprises taking a remedial action based on the determination as to the behavior. In another example, the halt instruction indicates a negative match determination as to the behavior, and performing the action comprises continuing normal system execution. In a further example, the halt instruction indicates additional monitoring should be performed, and performing the action comprises performing additional monitoring for the behavior. In yet another example, the event occurrence indicates that an event of the at least one event occurred. In a further still example, the event occurrence indicates that every event of the at least one event occurred. In another example, the first instruction indicating the at least one event further comprises an indication of a parameter for the at least one event, and the event occurrence associated with the at least one event indicates that an event having the parameter indicated by the first instruction occurred.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and
memory storing instructions that, when executed by the at least one processor, causes the system to perform a set of operations, the set of operations comprising:
generating, from a set of rule instructions for a first behavior rule to identify a behavior, an intermediate language output, wherein the intermediate language output is a representation of the set of rule instructions and comprises at least one event operation code and at least one halt operation code, wherein the halt operation code indicates a determination with respect to the behavior;
compiling the intermediate language output to generate a behavior rule binary;
generating an event hierarchy for the generated behavior rule binary, wherein the event hierarchy comprises an indication of one or more events processed by the behavior rule binary; and
distributing the generated behavior rule binary and information relating to the generated event hierarchy to a computing device, wherein the generated behavior rule binary is executable in a rule virtual machine of the computing device.

2. The system of claim 1, wherein the set of rule instructions comprises an instruction to launch a second behavior rule, and wherein the set of operations further comprises:
generating a launch chain for the behavior rule binary, wherein the launch chain comprises an indication that the generated behavior rule binary launches the second behavior rule.

3. The system of claim 2, wherein generating the launch chain further comprises:
evaluating the launch chain to determine whether a launch cycle is present in the launch chain; and
when it is determined that the launch cycle is present in the launch chain, generating an indication of the launch cycle.

4. The system of claim 2, wherein distributing the generated behavior rule binary further comprises distributing a second rule binary for the second behavior rule and information relating to the generated launch chain.

5. The system of claim 1, wherein distributing the generated behavior rule binary and information relating to the generated event hierarchy comprises distributing a packaged behavior rule, wherein the packaged behavior rule comprises a header, the generated behavior rule binary, and the information relating to the generated event hierarchy.

6. The system of claim 5, wherein the packaged behavior rule further comprises a second rule binary for a second behavior rule.

7. The system of claim 6, wherein the packaged behavior rule further comprises information relating to a launch chain for the first behavior rule and the second behavior rule.

8. A method for generating a packaged behavior rule for behavioral threat detection, comprising:
processing a first set of rule instructions to generate a first behavior rule binary, wherein the processing comprises: generating, from the first set of rule instructions, an intermediate language output, wherein the intermediate language output is a representation of the first set of rule instructions and comprises at least one event operation code and at least one halt operation code, wherein the halt operation code indicates a determination with respect to a behavior; and compiling the intermediate language output to generate the first behavior rule binary;
processing a second set of rule instructions to generate a second behavior rule binary;
generating an event hierarchy for the first behavior rule binary and the second behavior rule binary, wherein the event hierarchy comprises an indication of one or more events processed by the first behavior rule binary and the second behavior rule binary;
generating a launch chain for the first behavior rule binary and the second behavior rule binary, wherein the launch chain comprises an indication that the first behavior rule binary launches the second behavior rule binary;
generating a packaged behavior rule comprising the first behavior rule binary, the second behavior rule binary, information relating to the event hierarchy, and information relating to the launch chain; and
distributing the generated packaged behavior rule to a computing device.

9. The method of claim 8, wherein generating the launch chain further comprises:
evaluating the launch chain to determine whether a launch cycle is present in the launch chain; and
when it is determined that the launch cycle is present in the launch chain, generating an indication of the launch cycle.

10. The method of claim 8, wherein generating the launch chain further comprises:
evaluating the launch chain to determine whether a launch cycle is present in the launch chain; and
when it is determined that the launch cycle is present in the launch chain, automatically resolving the launch cycle in the launch chain.

11. The method of claim 8, wherein the packaged behavior rule further comprises a header and read-only data for at least one of the first behavior rule and the second behavior rule.

12. The method of claim 8, wherein distributing the generated packaged behavior rule to a computing device comprises providing the generated packaged behavior rule to a security service for further distribution.

13. A method for processing a behavior rule for behavioral threat detection, comprising:
generating, from a set of rule instructions for a first behavior rule to identify a behavior, an intermediate language output, wherein the intermediate language output is a representation of the set of rule instructions and comprises at least one event operation code and at least one halt operation code, wherein the halt operation code indicates a determination with respect to the behavior;
compiling the intermediate language output to generate a behavior rule binary;

generating an event hierarchy for the generated behavior rule binary, wherein the event hierarchy comprises an indication of one or more events processed by the behavior rule binary; and distributing the generated behavior rule binary and information relating to the generated event hierarchy to a computing device, wherein the generated behavior rule binary is executable in a rule virtual machine of the computing device.

14. The method of claim 13, wherein the set of rule instructions comprises an instruction to launch a second behavior rule, and wherein the method further comprises:

generating a launch chain for the behavior rule binary, wherein the launch chain comprises an indication that the generated behavior rule binary launches the second behavior rule.

15. The method of claim 14, wherein generating the launch chain further comprises:

evaluating the launch chain to determine whether a launch cycle is present in the launch chain; and when it is determined that the launch cycle is present in the launch chain, generating an indication of the launch cycle.

16. The method of claim 14, wherein distributing the generated behavior rule binary further comprises distributing a second rule binary for the second behavior rule and information relating to the generated launch chain.

17. The method of claim 13, wherein distributing the generated behavior rule binary and information relating to the generated event hierarchy comprises distributing a packaged behavior rule, wherein the packaged behavior rule comprises a header, the generated behavior rule binary, and the information relating to the generated event hierarchy.

18. The method of claim 17, wherein the packaged behavior rule further comprises a second rule binary for a second behavior rule.

19. The method of claim 18, wherein the packaged behavior rule further comprises information relating to a launch chain for the first behavior rule and the second behavior rule.

* * * * *